United States Patent
Zhang et al.

(10) Patent No.: US 12,177,088 B2
(45) Date of Patent: Dec. 24, 2024

(54) DETERMINING DATA LOSS FOR INTERNET TRAFFIC DATA

(71) Applicant: Adobe Inc., San Jose, CA (US)

(72) Inventors: Wei Zhang, Great Falls, VA (US); Ilya Borisovich Reznik, Millcreek, UT (US)

(73) Assignee: Adobe Inc., San Jose, CA (US)

( * ) Notice: Subject to any disclaimer, the term of this patent is extended or adjusted under 35 U.S.C. 154(b) by 213 days.

(21) Appl. No.: 17/938,742

(22) Filed: Oct. 7, 2022

(65) Prior Publication Data
US 2024/0119831 A1    Apr. 11, 2024

(51) Int. Cl.
*H04L 41/149* (2022.01)
*H04L 41/14* (2022.01)
*H04L 41/147* (2022.01)

(52) U.S. Cl.
CPC .......... *H04L 41/149* (2022.05); *H04L 41/145* (2013.01); *H04L 41/147* (2013.01)

(58) Field of Classification Search
CPC .... H04L 41/149; H04L 41/145; H04L 41/147
USPC ....................................................... 709/224
See application file for complete search history.

(56) References Cited

U.S. PATENT DOCUMENTS

| | | | | |
|---|---|---|---|---|
| 7,275,142 B1 * | 9/2007 | Schultz | ............... | G06F 11/2094 711/162 |
| 7,830,813 B1 * | 11/2010 | Lo | ....................... | G06F 11/3447 370/254 |
| 10,176,435 B1 * | 1/2019 | Sarkar | .................... | G06N 20/00 |
| 11,683,255 B2 * | 6/2023 | Yoshida | ................ | H04L 41/069 709/224 |
| 2013/0211871 A1 * | 8/2013 | Ghosh | .................... | G06Q 10/06 705/7.28 |
| 2017/0054817 A1 * | 2/2017 | Wang | ................ | H04W 74/0833 |
| 2017/0111233 A1 * | 4/2017 | Kokkula | ............. | H04L 41/0823 |
| 2023/0216772 A1 * | 7/2023 | Veyland | .................. | H04L 47/34 709/224 |
| 2023/0246900 A1 * | 8/2023 | Zhang | .................. | H04L 41/044 709/223 |

OTHER PUBLICATIONS

Digital economy index (2021), https://business.adobe.com/resources/digital-economy-index.html.

(Continued)

*Primary Examiner* — Ruolei Zong
(74) *Attorney, Agent, or Firm* — Keller Preece PLLC

(57) ABSTRACT

The present disclosure relates to systems, methods, and non-transitory computer readable media that determine internet traffic data loss from internet traffic data including bulk ingested data utilizing an internet traffic forecasting model. In particular, the disclosed systems detect that observed internet traffic data includes bulk ingested internet traffic data. In addition, the disclosed systems determine a predicted traffic volume for an outage period from the bulk ingested internet traffic data utilizing an internet traffic forecasting model. The disclosed systems further generate a decomposed predicted traffic volume for the outage period. The disclosed systems also determine an internet traffic data loss for the outage period from the decomposed predicted traffic volume while calibrating for pattern changes and late data from previous periods.

20 Claims, 10 Drawing Sheets

(56) References Cited

OTHER PUBLICATIONS

Ho, S., Xie, M.: The use of arima models for reliability forecasting and analysis. Computers & industrial engineering 35(1-2), 213{216 (1998).
Hochreiter, S., Schmidhuber, J.: Long short-term memory. Neural computation 9(8), 1735{1780 (1997).
Nobre, F., Williamson, G.D.: Dynamic linear model and sarima: a comparison of their forecasting performance in epidemiology. Statistics in medicine (2001).
Taylor, S.J., Letham, B.: Forecasting at scale. The American Statistician 72(1), 37{45 (2018).

\* cited by examiner

DETERMINING DATA LOSS FOR INTERNET TRAFFIC DATA

BACKGROUND

Recent years have seen significant advancement in hardware and software platforms that track and report internet traffic data statistics. Indeed, as the use of software-as-a-service (SaaS) systems and other internet-based systems have become increasingly ubiquitous, internet traffic monitoring systems have developed to track and analyze the ever-increasing traffic on such internet-based systems. For instance, in the field of internet traffic data reporting, some models can generate and estimate internet traffic data losses for service outages. Despite these advancements, a number of technical problems exist in the field of internet traffic data reporting, particularly with accuracy and flexibility. Specifically, internet traffic data loss reporting often relies on strong periodicity of observed internet traffic data to produce actionable results, but requiring such strong periodicity in data reporting is impractical or restrictive for many internet-based systems.

SUMMARY

One or more embodiments described herein provide benefits and/or solve one or more of the foregoing or other problems in the art with systems, methods, and non-transitory computer-readable media that accurately and flexibly determine internet traffic data loss for bulk ingested data utilizing an internet traffic forecasting model. In particular, in one or more embodiments, the disclosed systems detect bulk ingested internet traffic within observed internet traffic data. In addition, in some cases, the disclosed systems utilize an internet traffic forecasting model to predict internet traffic volume lost during an outage period where internet service is interrupted. In certain embodiments, the disclosed systems further adjust internet data loss predictions to account for recovery periods (e.g., where internet traffic data is merely late but not lost) as well as changes in internet traffic patterns (e.g., changes that are non-outage related). In this manner, the disclosed systems accurately and flexibly determine internet traffic data loss for bulk ingested internet traffic data.

Additional features and advantages of one or more embodiments of the present disclosure are outlined in the following description.

BRIEF DESCRIPTION OF THE DRAWINGS

This disclosure will describe one or more embodiments of the invention with additional specificity and detail by referencing the accompanying figures. The following paragraphs briefly describe those figures, in which.

DETAILED DESCRIPTION

Figure 1:
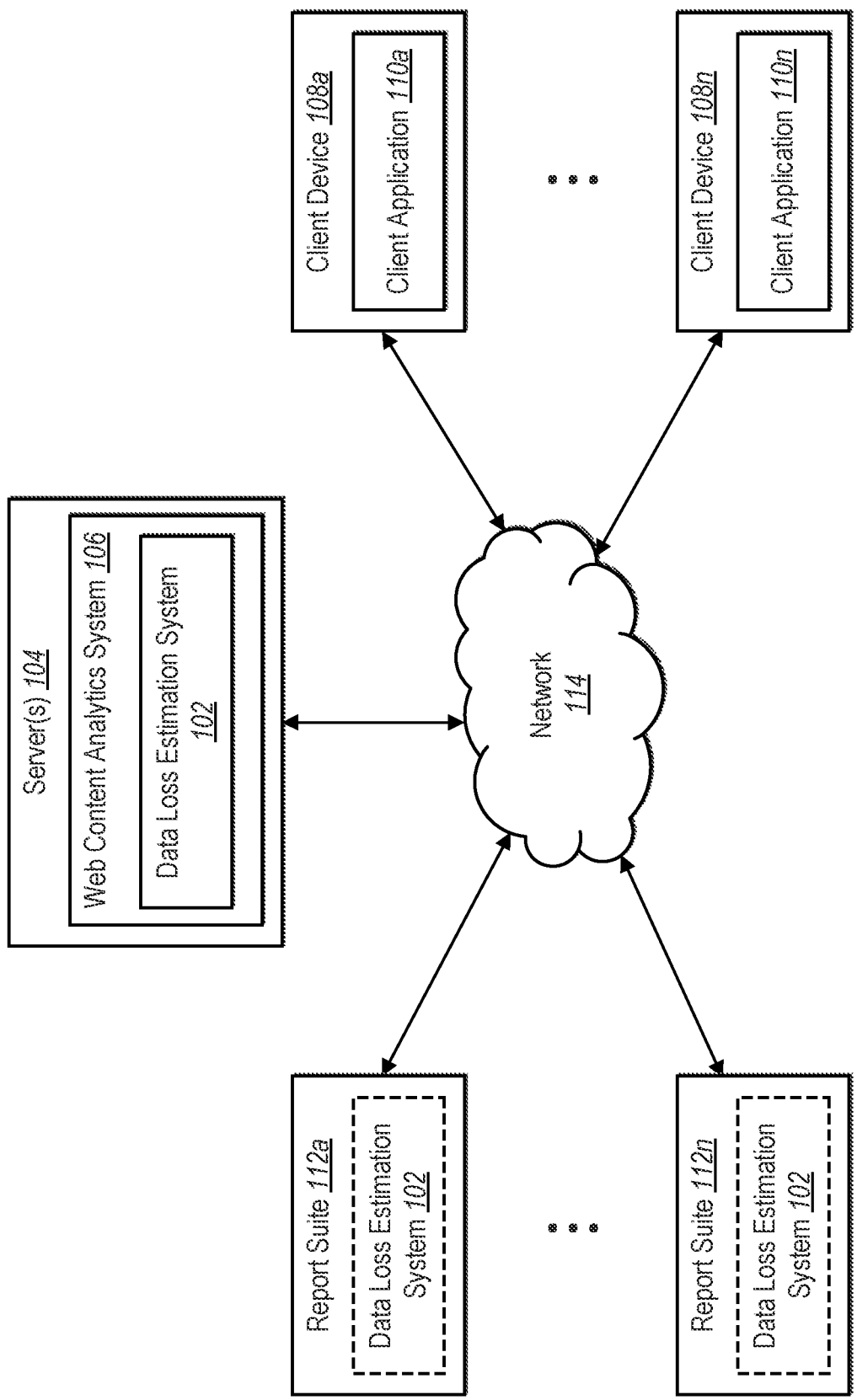
FIG. 1 illustrates an example environment in which a data loss estimation system operates in accordance with one or more embodiments.

One or more embodiments described herein include a data loss estimation system that determines or generates internet data loss for an outage period, including bulk ingested internet traffic data. Conventional internet traffic monitoring systems suffer from several technological shortcomings that result in inaccurate, inflexible operation. For instance, conventional systems are incapable of determining (or inaccurately determine) internet data loss from bulk ingested data. Specifically, the data loss models implemented by existing systems often require internet traffic data that has strong periodicity, with regular and constant data reporting over time. Consequently, these conventional systems cannot accommodate bulk ingested data where internet traffic data is inconsistently reported in chunks at regular or irregular intervals, and where no internet traffic data is reported between bulk ingestion entries. Along these lines, the inaccuracy of many existing systems is magnified in certain cases that result in overestimation of data loss determined by conventional models. For instance, the models used by many prior systems cannot account for cases where internet traffic data appears lost but is merely late and recovered at a later time and/or cases where reduction in internet traffic is due to some other non-outage related cause.

In addition to their inaccuracy, existing internet traffic monitoring systems are also inflexible. As just suggested, the data loss models of many existing systems are limited to internet traffic data with strong periodicity and regular, constant reporting. Accordingly, these systems cannot adapt to bulk ingested data and instead rigidly require reporting servers to relay constant streams of internet traffic data. In some cases, requiring such constant traffic data reporting from report suites is not only inflexible but also inefficient, consuming computing resources such as processing power and server bandwidth that might otherwise be preserved with a more flexible, efficient system that accommodates bulk ingested internet traffic data.

To overcome the deficiencies of prior systems, the data loss estimation system utilizes an internet traffic forecasting model that is capable of determining internet traffic data loss from bulk ingested data. For example, the data loss estimation system detects bulk ingested internet traffic data that is received from one or more report suites (e.g., hosted by one or more servers) in an all-at-once fashion, where internet traffic data comes in spikes at either regular or sporadic intervals with little or no data in between. In some cases, the data loss estimation system further receives an indication or a report an outage period (e.g., a customer service outage or "CSO") from observed internet traffic data, where internet traffic is interrupted or prevented for one or more software systems hosted at one or more servers. In certain instances, a CSO is a catastrophic event that leads to data loss, and it is vital to have timely and quantitative measurements of how much internet traffic data is lost. However, it is impractical or impossible for humans to determine such data loss due to the enormous amount of data involved in internet traffic monitoring.

Accordingly, in one or more embodiments, the data loss estimation system utilizes an internet traffic forecasting model to determine how much internet traffic data is lost during an outage period or CSO. More specifically, the data loss estimation system determines a predicted internet traffic data loss for an outage period from bulk ingested data and can do so without overestimating for late/recovered data and non-outage related internet traffic reductions. In some cases, the data loss estimation system utilizes a particular algorithm for determining internet traffic data loss for an outage period.

To illustrate, in one or more embodiments, the data loss estimation system converts observed or received internet traffic data (e.g., bulk ingested internet traffic data) from a smaller (e.g., hourly) periodicity to a larger (e.g., daily) periodicity by, for example, combining or totaling hits or other internet traffic data across a number of smaller periods (e.g., hours) to determine the internet traffic data for a larger period (e.g., a day). From the converted internet traffic data (e.g., the internet traffic data in the larger periodicity), in certain embodiments, the data loss estimation system builds a time-series internet traffic forecasting model based on periods (e.g., days) before a detected outage period. For instance, the data loss estimation system generates an internet traffic forecasting model that predicts internet traffic volume that would have occurred during the outage period (e.g., predicted daily hits) assuming the patterns or trends of the previous periods continued through the outage period.

Additionally, in one or more embodiments, the data loss estimation system decomposes the predicted traffic volume (e.g., the predicted daily hits) for the outage period into a different periodicity. For example, the data loss estimation system decomposes the predicted traffic volume from the larger (e.g., daily) periodicity back to the smaller (e.g., hourly) periodicity. To decompose the predicted traffic volume, in some cases, the data loss estimation system determines or estimates a traffic distribution or density over the smaller periodicity. For instance, the data loss estimation system generates a predicted traffic distribution to indicate when hits or other internet traffic would have occurred over the outage period given the distribution of internet traffic for periods of observed internet traffic data that that are not bulk ingested.

From the predicted distribution, in some embodiments, the data loss estimation system further generates a decomposed predicted traffic volume indicating when (e.g., at which increments of the smaller periodicity) the instances of the predicted traffic volume (for the larger periodicity) would have occurred. In certain cases, the data loss estimation system further determines an internet traffic data loss for the outage period from the decomposed predicted internet traffic volume. For instance, the data loss estimation system compares the decomposed predicted internet traffic volume with observed internet traffic volume for the outage period to determine how much internet traffic data was lost during the outage period.

To correct for recovery periods where internet traffic data is merely late and not lost, in one or more embodiments, the internet traffic forecasting model further predicts internet traffic volume for both the outage period and a corresponding recovery period that occurs (immediately) after the outage period. Additionally, in certain embodiments, the data loss estimation system prevents overestimation of data loss (as determined by a server) by correcting for non-outage related reductions in internet traffic volume. For instance, the data loss estimation system calibrates the internet traffic forecasting model to predict lost internet traffic volume based on a data ingestion period (e.g., a day) immediately prior to the outage period. In some cases, the data loss estimation system determines a calibration loss by comparing a predicted internet traffic volume and an observed internet traffic volume for the prior data ingestion period using the same algorithm as for the outage period. Thus, in some embodiments, the data loss estimation system modifies a predicted internet traffic data loss according to the calibration loss that indicates other non-outage based reductions in internet traffic.

As suggested, the data loss estimation system provides several advantages over conventional systems. For example, the data loss estimation system improves the accuracy of determining internet traffic data loss when compared to prior systems. To elaborate, unlike prior systems that cannot account for bulk ingested data, the data loss estimation system utilizes an internet traffic forecasting model that can predict lost traffic volume for outage periods from bulk ingested data. This improvement is especially salient in systems with large amounts of bulk ingested data, and some ADOBE systems log internet traffic where upwards of 58% (or even 74%) of the reports include bulk ingested data. In addition, the data loss estimation system prevents overestimation of lost internet traffic data that some prior systems are prone to predict. For instance, the data loss estimation system utilizes a calibration loss to account for non-outage related reductions in internet traffic. In some cases, the data loss estimation system further builds the internet traffic forecasting model to predict internet traffic volume not only for an outage period but also for a recovery period to account for recovered data that is not actually lost. Thus, the data loss estimation system corrects overestimated internet traffic data loss generated by a server device using the techniques described herein.

Additionally, the data loss estimation system improves the flexibility of internet traffic monitoring when compared to conventional systems. In particular, unlike many prior systems, the data loss estimation system uses an internet traffic forecasting model that flexibly adapts to bulk reporting of internet traffic data, in addition to periodic, regular internet traffic data. Due at least in part to its improved flexibility, the data loss estimation system improves efficiency over some prior systems. For example, the data loss estimation system preserves computing power and server bandwidth by facilitating bulk reporting of internet traffic data, where internet traffic data is reported and ingested in an all-at-once fashion rather than requiring constant reporting streams that (permanently) tie up servers and processors.

Additional detail regarding the data loss estimation system will now be provided with reference to the figures. For example, FIG. 1 illustrates a schematic diagram of an example system environment for implementing a data loss estimation system 102 in accordance with one or more embodiments. An overview of the data loss estimation system 102 is described in relation to FIG. 1. Thereafter, a more detailed description of the components and processes of the data loss estimation system 102 is provided in relation to the subsequent figures.

As shown, the environment includes server(s) 104, client devices 108a-108n, report suites 112a-112n, and a network 114. Each of the components of the environment communicate via the network 114, and the network 114 is any suitable network over which computing devices communicate. Example networks are discussed in more detail below in relation to FIG. 10.

As mentioned, the environment includes client devices 108a-108n. The client devices 108a-108n are one of a variety of computing devices, including a smartphone, a tablet, a smart television, a desktop computer, a laptop computer, a virtual reality device, an augmented reality device, or another computing device as described in relation to FIG. 10. The client devices 108a-108n communicate with the server(s) 104 and/or the report suites 112a-112n via the network 114. For example, the client devices 108a-108n provide information to the report suites 112a-112n indicating client device interactions (e.g., hits, visits, clicks, scrolls, or other interactions with web-based content) and receive information from the server(s) 104 (or elsewhere) such as websites, digital images, digital documents, or other web-based content. Thus, in some cases, the data loss estimation system 102 on the server(s) 104 provides and receives information based on client device interaction via the client devices 108a-108n.

As shown in FIG. 1, the client devices 108a-108n include client applications 110a-110n. In particular, the client applications 110a-110n are instances of a web application, a native application installed on the client devices 108a-108n (e.g., a mobile application, a desktop application, etc.), or a cloud-based application where all or part of the functionality is performed by the server(s) 104. Based on instructions from the client applications 110a-110n, the client devices 108a-108n present or display information to a user, including digital images, webpages, digital documents, or other web-based content. In some cases, the client applications 110a-110n communicate with the report suites 112a-112n for collecting internet traffic data.

Indeed, as illustrated in FIG. 1, the environment includes report suites 112a-112n. In particular, the report suites 112a-112n represent services housed at one or more servers (e.g., the server(s) 104 or elsewhere) for monitoring internet traffic. For example, the report suites 112a-112n include software and/or hardware designed to track or observe internet traffic, including hits, visits, clicks, scrolls, or other internet traffic associated with the client devices 108a-108n. In some cases, the report suites 112a-112n are customized for monitoring internet traffic associated with a particular website, a particular software-as-a-service ("SaaS") program, a particular internet service, or some other web-based domain. Based on monitoring internet traffic, the report suites 112a-112n generate internet traffic data for reporting to the data loss estimation system 102, organizing the observed internet traffic data into time-based periods (at various periodicities) to represent hits (or other traffic) that occurred within respective reporting/ingestion periods.

As illustrated in FIG. 1, the environment includes the server(s) 104. The server(s) 104 generates, tracks, stores, processes, receives, and transmits electronic data, such as internet traffic data and predicted internet traffic data loss. For example, the server(s) 104 receives data from the report suites 112a-112n in the form of observed internet traffic data (e.g., period-based reports on observed internet traffic). In response, the server(s) 104 generates and transmits data (e.g., a predicted internet traffic data loss) to an administrator device (associated with one or more of the report suites 112a-112n) to present or display a representation of the predicted internet traffic data loss for a relevant internet service.

In some embodiments, the server(s) 104 communicates with the client devices 108a-108n and/or the report suites 112a-112n to transmit and/or receive data via the network 114, including client device interactions, internet traffic data, predicted internet traffic data loss, and/or other data. In some embodiments, the server(s) 104 comprises a distributed server where the server(s) 104 includes a number of server devices distributed across the network 114 and located in different physical locations. The server(s) 104 comprise a content server, an application server, a communication server, a web-hosting server, a multidimensional server, a container orchestration server, or a machine learning server. The server(s) 104 further access and utilize a database to store and retrieve information such as internet traffic data, an internet traffic forecasting model, and/or predicted internet traffic data loss.

As further shown in FIG. 1, the server(s) 104 also includes the data loss estimation system 102 as part of a web content analytics system 106. For example, in one or more implementations, the web content analytics system 106 is able to track, store, generate, modify, edit, enhance, provide, distribute, and/or share analytics content, such as internet traffic data, predicted internet traffic data loss, or other internet-based metrics. For example, the web content analytics system 106 provides tools for the administrator devices to generate and modify monitoring strategies for determining various internet traffic metrics.

In one or more embodiments, the server(s) 104 includes all, or a portion of, the data loss estimation system 102. For example, the data loss estimation system 102 operates on the server(s) to generate and provide a predicted internet traffic data loss. In some cases, the data loss estimation system 102 utilizes, locally on the server(s) 104 or from another network location, an internet traffic forecasting model.

In certain cases, the client devices 108a-108n and/or the report suites 112a-112n include all or part of the data loss estimation system 102. For example, the client devices 108a-108n and/or the report suites 112a-112n generate, obtain (e.g., download), or utilize one or more aspects of the data loss estimation system 102 from the server(s) 104. Indeed, in some implementations, as illustrated in FIG. 1, the data loss estimation system 102 is located in whole or in part on the client devices 108a-108n and/or the report suites 112a-112n. For example, the data loss estimation system 102 includes a web hosting application that allows the client devices 108a-108n and/or the report suites 112a-112n to interact with the server(s) 104. To illustrate, in one or more implementations, the client devices 108a-108n accesses a web page supported and/or hosted by the server(s) 104.

Although FIG. 1 illustrates a particular arrangement of the environment, in some embodiments, the environment has a different arrangement of components and/or may have a different number or set of components altogether. For instance, as mentioned, the data loss estimation system 102 is implemented by (e.g., located entirely or in part on) the client devices 108a-108n and/or the report suites 112a-112n. In addition, in one or more embodiments, the client devices 108a-108n and/or the report suites 112a-112n communicate directly with the data loss estimation system 102, bypassing the network 114. Further, in some embodiments, the environment includes a database maintained by the server(s) 104, the client devices 108a-108n, the report suites 112a-112n, or a third-party device.

Figure 2:
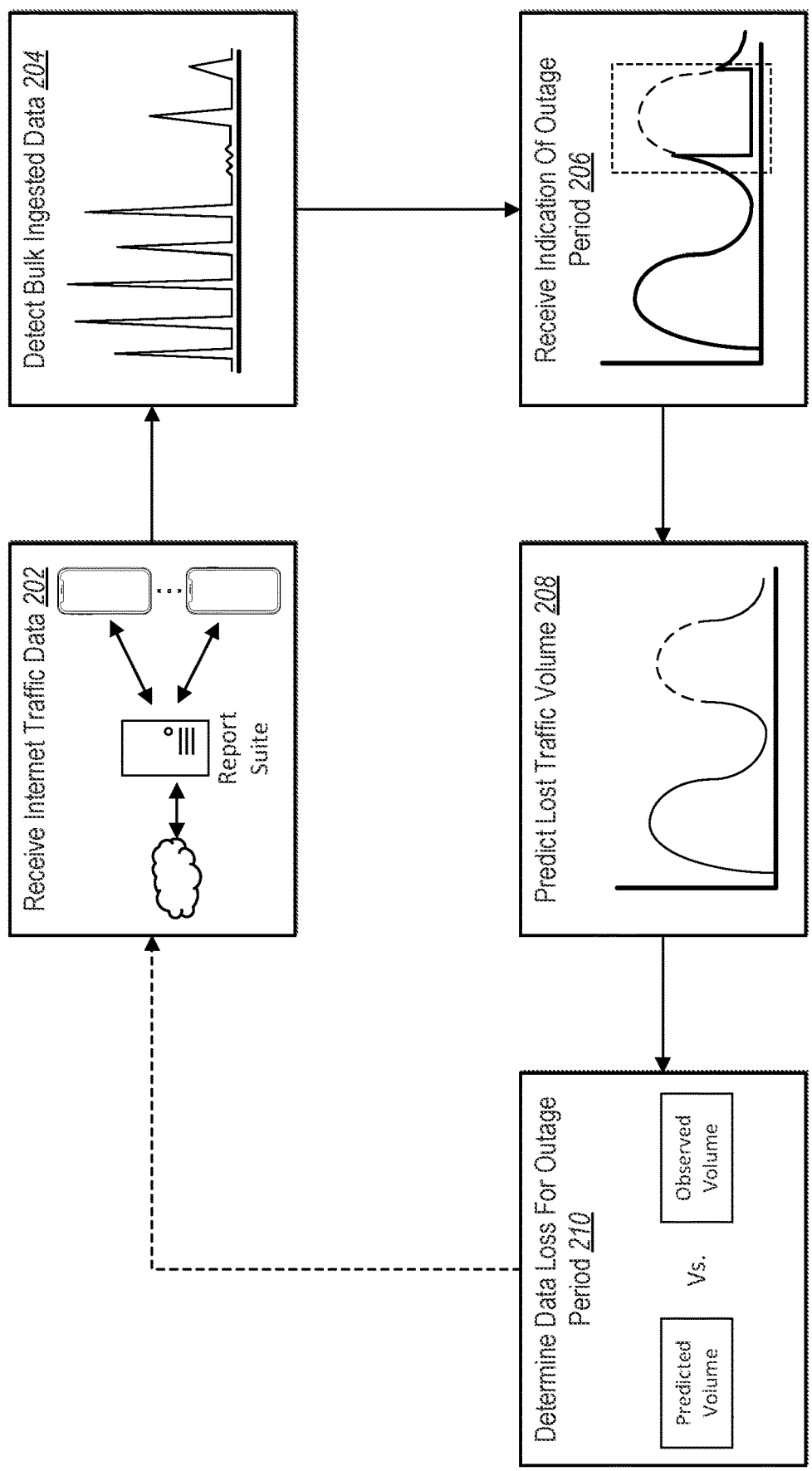
FIG. 2 illustrates an overview diagram of the data loss estimation system determining a predicted internet traffic volume for an outage period from bulk ingested data in accordance with one or more embodiments.

As mentioned above, in one or more embodiments, the data loss estimation system 102 determines an internet traffic data loss from bulk ingested data. For example, the data loss estimation system 102 utilizes an internet traffic forecasting model to predict internet traffic data loss from bulk ingested data. FIG. 2 illustrates an example overview of determining a predicted internet traffic data loss from bulk ingested data in accordance with one or more embodiments. Additional detail regarding the various acts illustrated in FIG. 2 is provided thereafter with reference to subsequent figures. Furthermore, as will be appreciated by one skilled in the art, the graphs illustrated in FIG. 2 and the subsequent figures represent internet traffic volume (e.g., hits) along the y-axis over time, the x-axis.

As illustrated in FIG. 2, the data loss estimation system 102 performs an act 202 to receive internet traffic data. In particular, the data loss estimation system 102 receives or ingests observed internet traffic data from one or more report suites (housed at one or more servers). For example, the data loss estimation system 102 receives internet traffic data in the form of numbers of hits that are received from client devices at one or more websites or other internet-based services (as specified by an administrator device defining a data monitoring strategy). In some cases, a hit indicates a single interaction with an internet-based service including a timestamp of when the interaction occurred (and a timestamp of when the hit completed processing and became available to a report suite). Indeed, one or more report suites monitor internet traffic from client devices and generate internet traffic data indicating internet traffic that occurs over time (e.g., within respective reporting/ingestion periods). The data loss estimation system 102 receives or ingests the internet traffic data from the report suite(s) in turn.

In some cases, the data loss estimation system 102 receives the internet traffic data as a constant stream (e.g., contemporaneously with the monitoring of the internet traffic by the report suite or as the hits finish processing and are available to report suites), while in other cases the data loss estimation system 102 receives the internet traffic data as bulk ingested data. For either non-bulk ingested or bulk ingested internet traffic data, the data loss estimation system 102 determines a periodicity associated with the internet traffic data. For example, the periodicity of the internet traffic data indicates recurring intervals or patterns of the internet traffic data, where the ingestion periods can vary in duration (e.g., from seconds to months and any intervals in between). Indeed, internet traffic data often varies over time, where more hits may occur in daytime hours or on weekends and fewer hits occur at night or during the week, depending on the internet-based service being monitored. In some embodiments, an ingestion period has a first periodicity of a day to indicate a number of hits (or other internet traffic data) that occur in a day. In these or other embodiments, an ingestion period has a second periodicity of an hour to indicate a number of hits (or other internet traffic data) that occur in an hour.

As further illustrated in FIG. 2, the data loss estimation system 102 performs an act 204 to detect bulk ingested data. To elaborate, the data loss estimation system 102 detects bulk ingested data reported by one or more report suites as part of observed internet traffic data. For example, bulk ingested data includes observed internet traffic data that is reported once per ingestion period (as opposed to constantly throughout an ingestion period). In some cases, bulk ingested internet traffic data includes a single report of hits that occurred within a day, within an hour, or within an ingestion period of some other periodicity. As shown, the bulk ingested internet traffic data indicates large spikes of hits (or other internet traffic) when bulk ingested with no little or data received in between.

To detect bulk ingested internet traffic data, the data loss estimation system 102 detects that observed internet traffic data is received from the one or more report suites at intermittent intervals without receiving internet traffic data between the intermittent intervals (or receiving internet traffic data that is below a threshold volume). In some cases, the data loss estimation system 102 determines a number of ingestion entries that should occur during an ingestion period for non-bulk ingested data (e.g., as if the data were constantly reported). In addition, the data loss estimation system 102 compares the number of entries that should have been received with an actual number of received ingestion entries to determine a number of missing ingestion entries for the ingestion period. If the number of missing ingestion entries satisfies a missing entry threshold for the ingestion period, then the data loss estimation system 102 determines that the internet traffic data for the ingestion period is bulk ingested. Additional detail regarding detecting bulk ingested internet traffic data is provided below with reference to later figures.

As further illustrated in FIG. 2, the data loss estimation system 102 performs an act 206 to receive an indication of an outage period. In particular, the data loss estimation system 102 receives a report of an outage from one or more client devices and/or from one or more internet traffic monitoring servers. In response to receiving an outage report, the data loss estimation system 102 generates internet traffic data loss estimations in an on-demand fashion (and in near real time) based on the report (which can also serve as a request for a lost traffic determination). For instance, the data loss estimation system 102 performs the remaining acts illustrated in FIG. 2 in response to receiving the indication of the outage.

In some cases, the data loss estimation system 102 detects an outage period from observed internet traffic data received from a report suite. For instance, the data loss estimation system 102 analyzes observed internet traffic data (bulk ingested or otherwise) to detect, as an outage period, one or more ingestion periods with little or no observed internet traffic data (e.g., no ingestion entries or ingestion entries reflecting no internet traffic data). To detect the outage period, in some embodiments, the data loss estimation system 102 compares the ingested hits for an ingestion period with an average over a number of previous ingestion periods to determine that the ingestion period falls at least a threshold number (or percentage) of hits below the average. In some cases, the data loss estimation system 102 detects an outage period based on additional or alternative factors such as an outage report from a report suite.

Based on receiving an indication of, or detecting, an outage period, as shown in FIG. 2, the data loss estimation system 102 further performs an act 208 to predict a lost traffic volume. More specifically, the data loss estimation system 102 predicts or projects a volume of internet traffic (e.g., a volume or a number of hits) that would have occurred during the outage period if not for the service outage. Indeed, the data loss estimation system 102 determines an internet traffic volume for an internet-based service assuming normal operation where no outage occurred. As shown, the portion of the curve that drops to zero hits represents an outage period.

To generate the prediction of lost traffic volume, the data loss estimation system 102 builds and utilizes an internet traffic forecasting model. To elaborate, the data loss estimation system 102 builds the internet traffic forecasting model based on one or more ingestion periods (immediately) prior to the outage period. For example, the data loss estimation system 102 generates the internet traffic forecasting model to predict internet traffic volume based on the assumption that the pattern of internet traffic over prior ingestion periods will continue for subsequent ingestion periods. Indeed, an internet traffic forecasting model can refer to a heuristic time-series forecasting model that predicts or projects internet traffic volume (e.g., hits) over time based on previous internet traffic volume.

Using the internet traffic forecasting model, the data loss estimation system 102 determines a predicted number of hits lost during the outage period based on the hits received for an ingestion period immediately prior to the outage period. As shown, the dashed portion of the curve represents the predicted internet traffic volume lost during the outage period (e.g., the same portion of the curve for the observed internet traffic data that dropped to zero hits). Thus, the data loss estimation system 102 calibrates data loss estimation based on one or more previous time periods.

As further illustrated in FIG. 2, the data loss estimation system 102 performs an act 210 to determine a data loss for the outage period. More particularly, the data loss estimation system 102 determines an internet traffic data loss for the outage period based on the predicted lost traffic volume. For example, the data loss estimation system 102 decomposes the predicted lost traffic volume to determine a distribution of timestamps when each of the respective predicted hits would have occurred during the outage period. The data loss estimation system 102 further compares the decomposed predicted lost volume with the internet traffic data observed for the outage period to determine an amount (e.g., a number of hits) of internet traffic data that was lost during the outage period.

As shown, in some embodiments, the data loss estimation system 102 repeats the acts illustrated in FIG. 2. For example, the data loss estimation system 102 continuously monitors internet traffic data using report suites for various internet services. In addition, the data loss estimation system 102 accurately determines internet traffic data losses for outage periods for each internet service (as designated by administrator devices defining report suites for monitoring internet traffic for respective services). Even for bulk ingested data where other models fail, the data loss estimation system 102 determines accurate internet traffic data loss. Additional detail regarding comparisons between the data loss estimation system 102 and prior systems is provided below.

Figure 3:
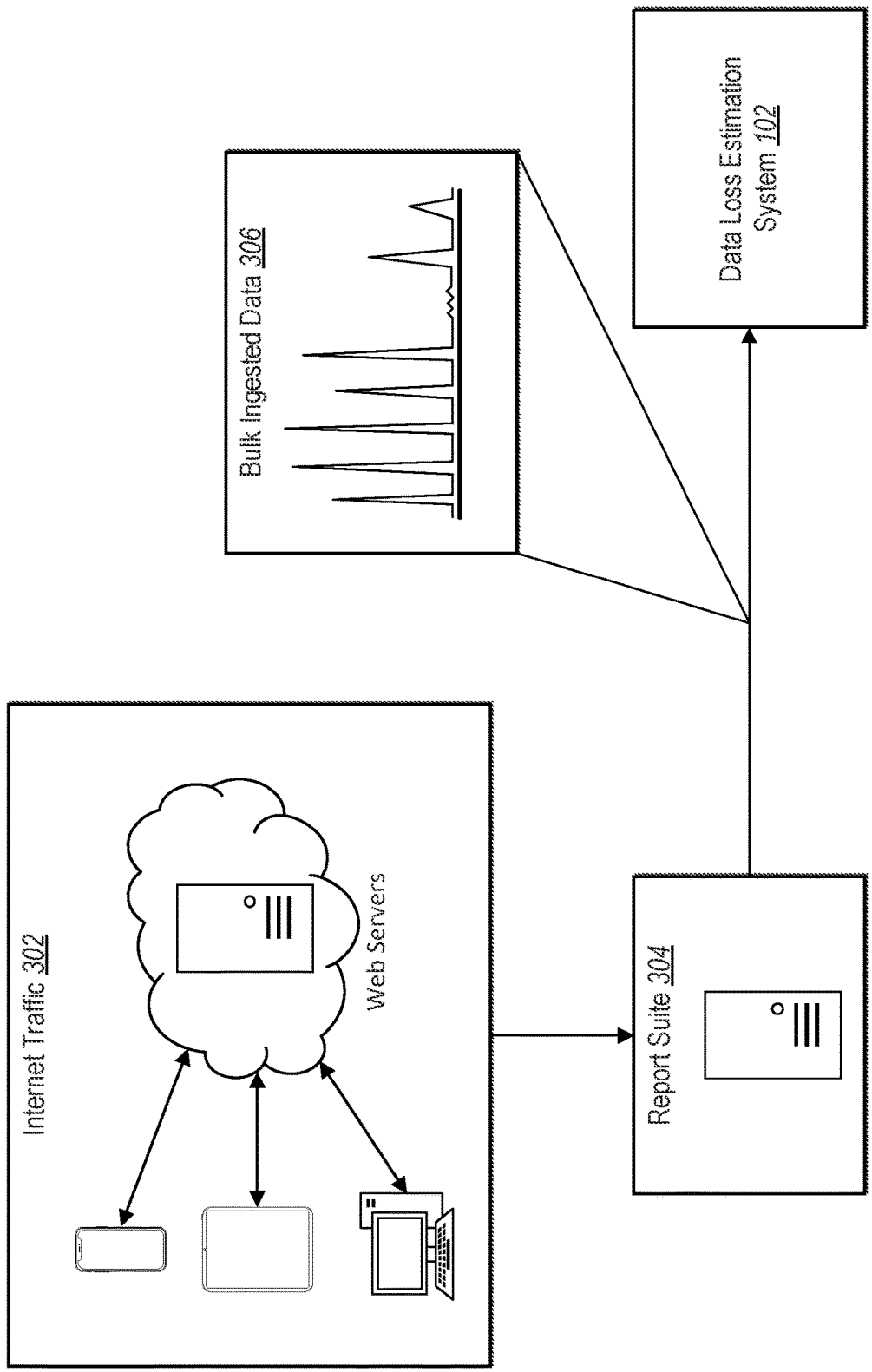
FIG. 3 illustrates a diagram of detecting bulk ingested internet traffic data in accordance with one or more embodiments.

As mentioned above, in certain described embodiments, the data loss estimation system 102 detects bulk ingested internet traffic data. In particular, the data loss estimation system 102 determines bulk ingested internet traffic data indicating hits (or other internet traffic) over an ingestion period, where the data is ingested all at once (e.g., in a single report) instead of constantly over the ingestion period. FIG. 3 illustrates an example diagram for detecting bulk ingested internet traffic data in accordance with one or more embodiments.

As illustrated in FIG. 3, the data loss estimation system 102 receives or ingests bulk ingested data 306 from a report suite 304. In particular, the report suite 304 collects or generates internet traffic data to provide to the data loss estimation system 102 from internet traffic 302. The internet traffic 302 represents hits or other internet traffic of client devices interacting with web content hosted by web servers. The report suite 304 represents a software monitoring service hosted at one or more servers with data monitoring parameters set by an administrator device. For example, the report suite 304 is set up to monitor internet traffic associated with a particular webpage or internet-based service. Accordingly, the report suite 304 monitors the internet traffic 302 and generates internet traffic data for ingestion by the data loss estimation system 102.

As shown, the data loss estimation system 102 receives or ingests internet traffic data from the report suite 304. In addition, the data loss estimation system 102 detects bulk ingested data 306 as part of the internet traffic data observed by the report suite 304. As shown, the bulk ingested data 306 indicates large spikes in hits at respective ingestion entries (e.g., instances where internet traffic data is reported or ingested as a sum of multiple smaller periods) with little or no hits between ingestion entries.

To detect the bulk ingested data 306, the data loss estimation system 102 determines a number of missing ingestion entries for an ingestion period. To elaborate, the data loss estimation system 102 determines how many ingestion entries should occur within an ingestion period (e.g., based on a duration of the ingestion period) under normal non-bulk reporting. In addition, the data loss estimation system 102 compares the number of missing ingestion entries with a missing entry threshold. If the number of missing ingestion entries satisfies the threshold, the data loss estimation system 102 determines that the ingestion period is bulk ingested.

Beyond a single ingestion period, the data loss estimation system 102 further detects the bulk ingested data 306 spanning multiple ingestion periods. For instance, the data loss estimation system 102 determines a number of bulk ingestion periods that satisfy the above-mentioned missing ingestion entry threshold. If the number of bulk ingestion periods within a set of observed internet traffic data satisfies a bulk ingestion period threshold, then the data loss estimation system 102 determines that the observed internet traffic data is bulk ingested. In some cases, the data loss estimation system 102 determines bulk ingested data according to the following formula: i) if $m_i > \gamma$, then the ingestion period is bulk ingested, and ii) if the number of bulk ingestion periods is greater than $\delta$, then the internet traffic data as a whole is bulk ingested, where $m_i$ represents a missing ingestion entry from i=1, . . . , N, and where $\gamma$ is a set value (e.g., 12) and $\delta = 0.1 \times N$.

Figure 4:
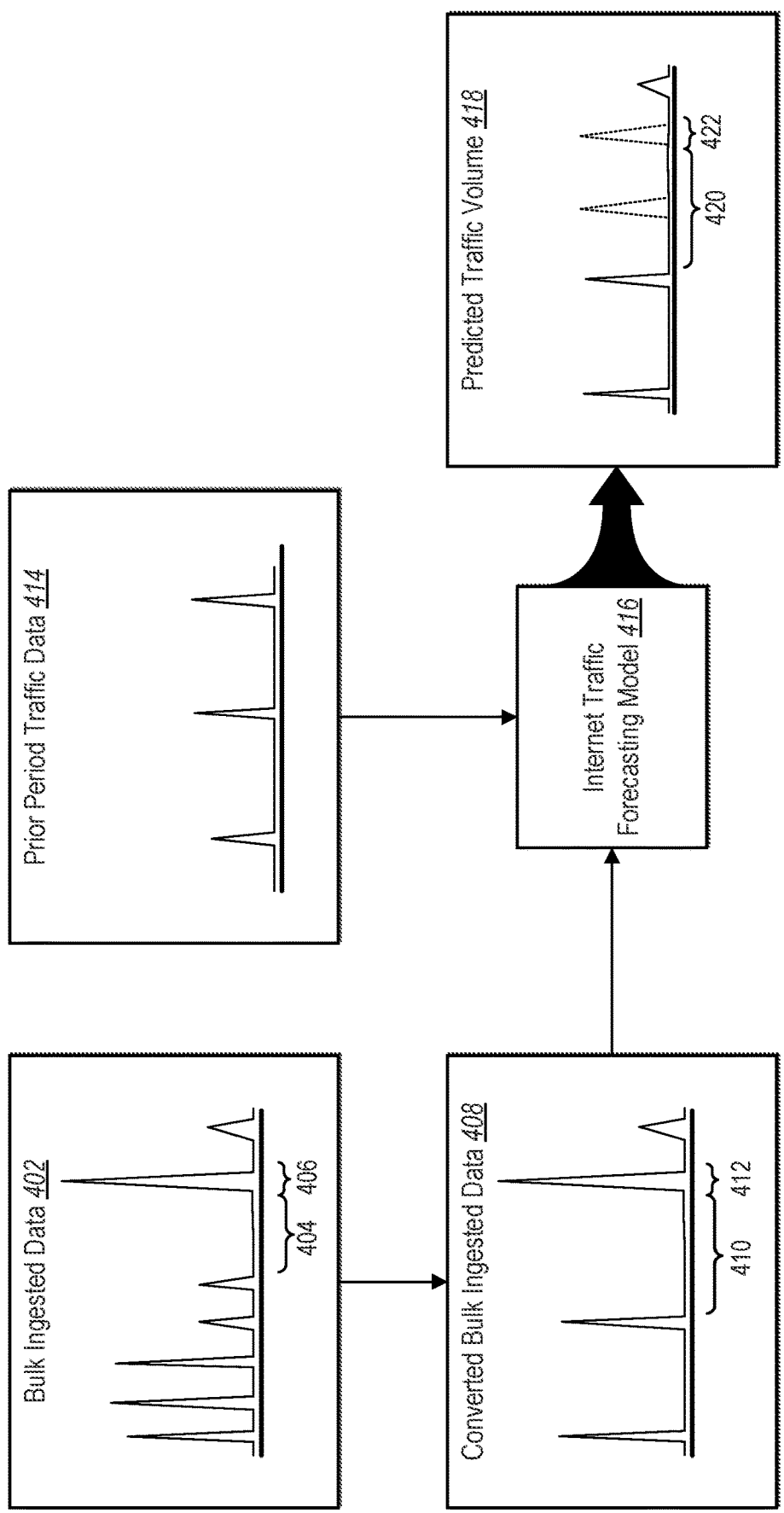
FIG. 4 illustrates an example diagram for determining a predict traffic volume from bulk ingested data utilizing an internet traffic forecasting model in accordance with one or more embodiments.

As mentioned, in certain embodiments, the data loss estimation system 102 detects an outage period associated with (e.g., within) observed internet traffic data. In particular, the data loss estimation system 102 detects and outage period from bulk ingested data and determines a predicted traffic volume lost during the outage period. FIG. 4 illustrates an example diagram for predicting lost internet traffic volume from bulk ingested traffic data during an outage period in accordance with one or more embodiments.

As illustrated in FIG. 4, the data loss estimation system 102 identifies or detects bulk ingested data 402. Within the bulk ingested data 402, the data loss estimation system 102 further identifies or detects an outage period 404 and a recovery period 406. To elaborate, the data loss estimation system 102 detects the outage period 404 by analyzing the bulk ingested data 402 to identify one or more missing ingestion entries. For instance, the data loss estimation system 102 performs a comparative analysis of the bulk ingested data 402 to identify, as the outage period 404, a period of time where a bulk ingestion entry should have occurred based on timing of previous bulk ingestion entries (e.g., the spikes of reported hits) indicated by the bulk ingested data 402. In some cases, the data loss estimation system 102 detects the outage period 404 by receiving an indication of an outage from a report suite or from one or more servers.

In addition, the data loss estimation system 102 detects the recovery period 406. For instance, the data loss estimation system 102 detects the recovery period 406 by determining, as the recovery period 406, a threshold timeframe that elapses after the outage period 404. In some embodiments, the data loss estimation system 102 determines the recovery period 406 based on a periodicity of the bulk ingested data 402 (e.g., where the threshold timeframe is longer for larger periodicities and shorter for smaller periodicities). In some cases, the data loss estimation system 102 need not detect the recovery period 406, but the data loss estimation system 102 instead treats a threshold number of bulk ingestion entries (e.g., a single entry) immediately following the outage period 404 as the recovery period 406.

As further illustrated in FIG. 4, the data loss estimation system 102 generates converted bulk ingested data 408 from the bulk ingested data 402. More specifically, the data loss estimation system 102 converts the bulk ingested data 402 from one periodicity to another. In some embodiments, the data loss estimation system 102 converts the bulk ingested data 402 from a shorter periodicity (e.g., hours) to a longer periodicity (e.g., days). For instance, the data loss estimation system 102 generates the converted bulk ingested data 408 by determining a periodicity or a duration associated with the outage period 404 and converting the bulk ingested data 402 to the periodicity (or duration) of the outage period 404 by, for example, combining or summing hourly hits across an entire day. In one or more embodiments, the data loss estimation system 102 generates the converted bulk ingested data 408 in a periodicity specified by an administrator device. As shown, the converted bulk ingested data 408 includes a converted outage period 410 that corresponds to the outage period 404 (but in the new periodicity) and a converted recovery period 412 that corresponds to the recovery period 406 (but in the new periodicity).

As further illustrated in FIG. 4, the data loss estimation system 102 builds an internet traffic forecasting model 416 from prior period traffic data 414. To elaborate, the data loss estimation system 102 builds or generates the internet traffic forecasting model 416 to predict traffic volume to reflect the prior period traffic data 414. Indeed, the prior period traffic data 414 represents internet traffic data observed for one or more ingestion periods prior to the outage period 404 (or 410). The data loss estimation system 102 thus utilizes the internet traffic forecasting model 416 in the form of a time-series forecasting algorithm, such as a modified/specialized version of one of the following: i) an autoregressive integrated moving average (ARIMA) model as described by S. Ho and M. Xie in *The Use of ARIMA Models for Reliability Forecasting and Analysis*, Computers & Industrial Engineering vol. 35 issues 1-2, 213-16 (1998); ii) a seasonal ARIMA model as described by F. Nobre and G. D. Williamson in *Dynamic Linear Model and SARIMA: A Comparison of their Forecasting Performance in Epidemiology*, Statistics in Medicine (2001); iii) a long short-term memory (LSTM) model as described by S. Hochreiter and J. Schmidhuber in *Long Short-term Memory*, Neural Computation vol. 9 issue 8, 1735-80 (1997); and/or iv) a Prophet model as described by S. J. Taylor and B. Letham in *Forecasting at Scale*, The American Statistician vol. 72 issue 1, 37-45 (2018). Indeed, in some embodiments, the internet traffic forecasting model 416 is a machine learning model designed to generate the predicted traffic volume 418.

For example, a machine learning model includes a computer algorithm or a collection of computer algorithms that automatically improve for a particular task through iterative outputs or predictions based on use of data. For example, a machine learning model can utilize one or more learning techniques to improve in accuracy and/or effectiveness. Example machine learning models include various types of neural networks, decision trees, support vector machines, linear regression models, and Bayesian networks.

In some cases, the internet traffic forecasting model 416 includes a neural network that can be trained and/or tuned based on inputs to determine classifications, scores, or approximate unknown functions. For example, a neural network includes a model of interconnected artificial neurons (e.g., organized in layers) that communicate and learn to approximate complex functions and generate outputs (e.g., generated recommendation scores) based on a plurality of inputs provided to the neural network. In some cases, a neural network refers to an algorithm (or set of algorithms) that implements deep learning techniques to model high-level abstractions in data. A neural network can include various layers such as an input layer, one or more hidden layers, and an output layer that each perform tasks for processing data. For example, a neural network can include a deep neural network, a convolutional neural network, a recurrent neural network (e.g., an LSTM), a graph neural network, or a generative adversarial neural network.

As mentioned, to build the internet traffic forecasting model 416, the data loss estimation system 102 utilizes the prior period traffic data 414. More specifically, the data loss estimation system 102 learns parameters for training or tuning the internet traffic forecasting model 416 from the prior period traffic data 414. In some cases, the data loss estimation system 102 utilizes only internet traffic data from a data ingestion period (e.g., a day) immediately prior to the outage period 404 (or 410) to build or train the internet traffic forecasting model 416. For example, the data loss estimation system 102 inputs the prior period traffic data 414 into the internet traffic forecasting model 416 and modifies parameters such as weights or biases according to training requirements specific to the model type (e.g., as described in the respective scholarly works cited above for different model types).

In one or more embodiments, the data loss estimation system 102 further customizes the internet traffic forecasting model 416 according to seasonality. Often, when building a time-series forecasting model, seasonality is treated as additive, which means that the effect of a seasonality is added to a trend to produce a forecast. However, because the internet traffic data observed by the data loss estimation system 102 represents traffic volume for internet services, and because the traffic volume for different internet services can grow over time and have significant differences over different ingestion periods (e.g., weekdays vs. weekends), the data loss estimation system 102 implements multiplicative seasonality for the internet traffic forecasting model 416. In using multiplicative seasonality (e.g., where there are changes in widths and/or heights of seasonal periods of data over time), the internet traffic forecasting model 416 better accommodates non-linear trends in internet traffic data, changes in frequency of ingestion periods, and changes in traffic volume over ingestion periods. Indeed, experimenters demonstrated around a 10% improvement in accuracy using multiplicative seasonality for the internet traffic forecasting model 416 when compared to additive seasonality.

As further illustrated in FIG. 4, the data loss estimation system 102 utilizes the internet traffic forecasting model 416 to generate a predicted traffic volume 418 from the converted bulk ingested data 408 (based on the prior period traffic data 414). More specifically, once the data loss estimation system 102 builds or trains the internet traffic forecasting model 416, the data loss estimation system 102 further implements the internet traffic forecasting model 416 to generate the predicted traffic volume 418 which indicates a volume of internet traffic missed or lost due to the outage period 404 (or 410). As shown, the data loss estimation system 102 generates the predicted traffic volume 418 in a periodicity corresponding to that of the converted outage period 410 from the converted bulk ingested data 408 (e.g., hits lost during an outage period day).

Not only does the data loss estimation system 102 utilize the internet traffic forecasting model 416 to predict lost internet traffic volume over the outage period 404 (or 410), but also for the recovery period 406 (or 412). Thus, the data loss estimation system 102 prevents overestimating lost traffic volume by accounting for recovered data that is late or delayed but not necessarily missing or lost due to an outage. Indeed, the abnormally tall spikes in the recovery period 406 and the converted recovery period 412 indicate that at least some internet traffic volume was recovered after the respective outages.

In one or more embodiments, the data loss estimation system 102 thus generates the predicted traffic volume 418 utilizing the internet traffic forecasting model 416 to make such a prediction from the converted bulk ingested data 408 in accordance with (model parameters learned from) the prior period traffic data 414. As illustrated, the predicted traffic volume 418 includes internet traffic volume for the outage period 420 and for the corresponding recovery period 422 (as indicated by the dashed portion of the graph).

Figure 5:
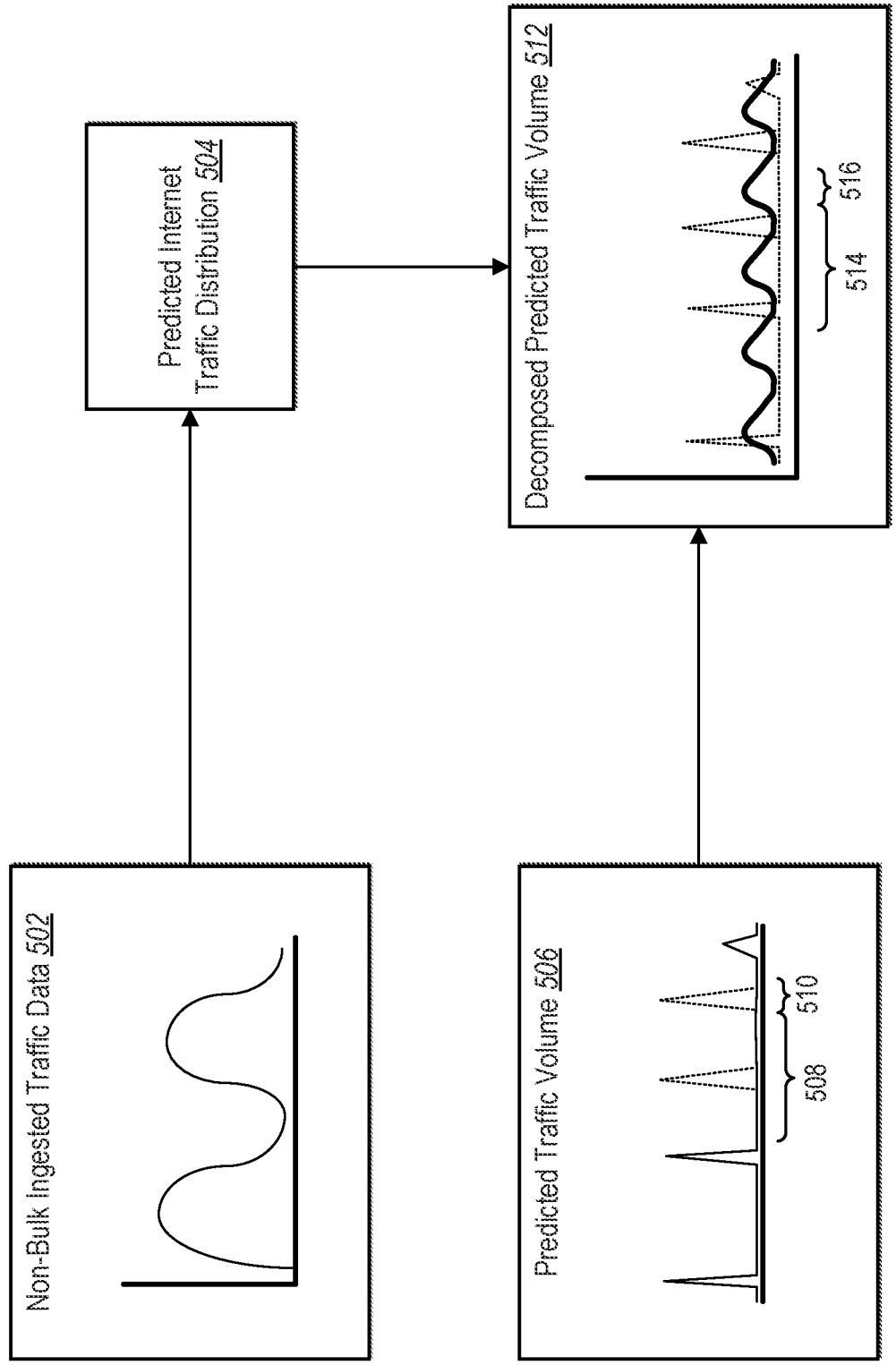
FIG. 5 illustrates an example diagram for determining a decomposed predicted traffic volume in accordance with one or more embodiments.

As mentioned above, in certain embodiments, the data loss estimation system 102 decomposes predicted internet traffic volume to simulate or resemble non-bulk ingested internet traffic data. In particular, the data loss estimation system 102 decomposes predicted traffic volume according to an estimated distribution of when respective hits (or other traffic instances) would have occurred during an outage period and a corresponding recovery period. FIG. 5 illustrates an example diagram for generating decomposed predicted traffic volume in accordance with one or more embodiments.

As illustrated in FIG. 5, the data loss estimation system 102 determines a predicted internet traffic distribution 504 from non-bulk ingested traffic data 502. To elaborate, the data loss estimation system 102 identifies one or more ingestion periods (e.g., days) of observed internet traffic data that are not bulk ingested. For example, the data loss estimation system 102 detects periodic, constant internet traffic reporting for one or more ingestion periods associated with a report suite. In addition, the data loss estimation system 102 determines an average traffic distribution (e.g., an average hit distribution) over the non-bulk ingestion periods. The data loss estimation system 102 further utilizes the average traffic distribution of the non-bulk ingested traffic data 502 as the predicted internet traffic distribution 504 for the bulk ingested internet traffic data, including any outage period and/or recovery period.

Indeed, as shown in FIG. 5, the data loss estimation system 102 decomposes the predicted traffic volume 506 (e.g., the predicted traffic volume 418) reflecting a bulk-ingested prediction of volume lost during an outage period 508 and recovered during a recovery period 510. Indeed, the data loss estimation system 102 generate the decomposed predicted traffic volume 512 from the predicted traffic volume 506 (and based on the predicted internet traffic distribution 504). In decomposing the predicted traffic volume 506, the data loss estimation system 102 changes the periodicity of the predicted traffic volume 506 from a larger periodicity (e.g., days) as generated by an internet traffic forecasting model to a smaller periodicity (e.g., hours) corresponding to the periodicity of the predicted internet traffic distribution 504.

Indeed, the data loss estimation system 102 predicts timestamps for the respective hits of the predicted traffic volume 506 according to timestamps indicated by the predicted internet traffic distribution 504. As shown, the decomposed predicted traffic volume 512 reflects a decomposed version of the predicted traffic volume 506 (e.g., the periodic wavey curve where hits are occurring at different times) compared with the spikey volume data of the predicted traffic volume 506 (e.g., where hits are ingested all at once with gaps in between the spikes). The decomposed predicted traffic volume 512 thus indicates timestamps (e.g., in the smaller periodicity) where hits would have occurred during an outage period 514 (corresponding to the outage period 508) and a recovery period 516 (corresponding to the recovery period 510).

Figure 6:
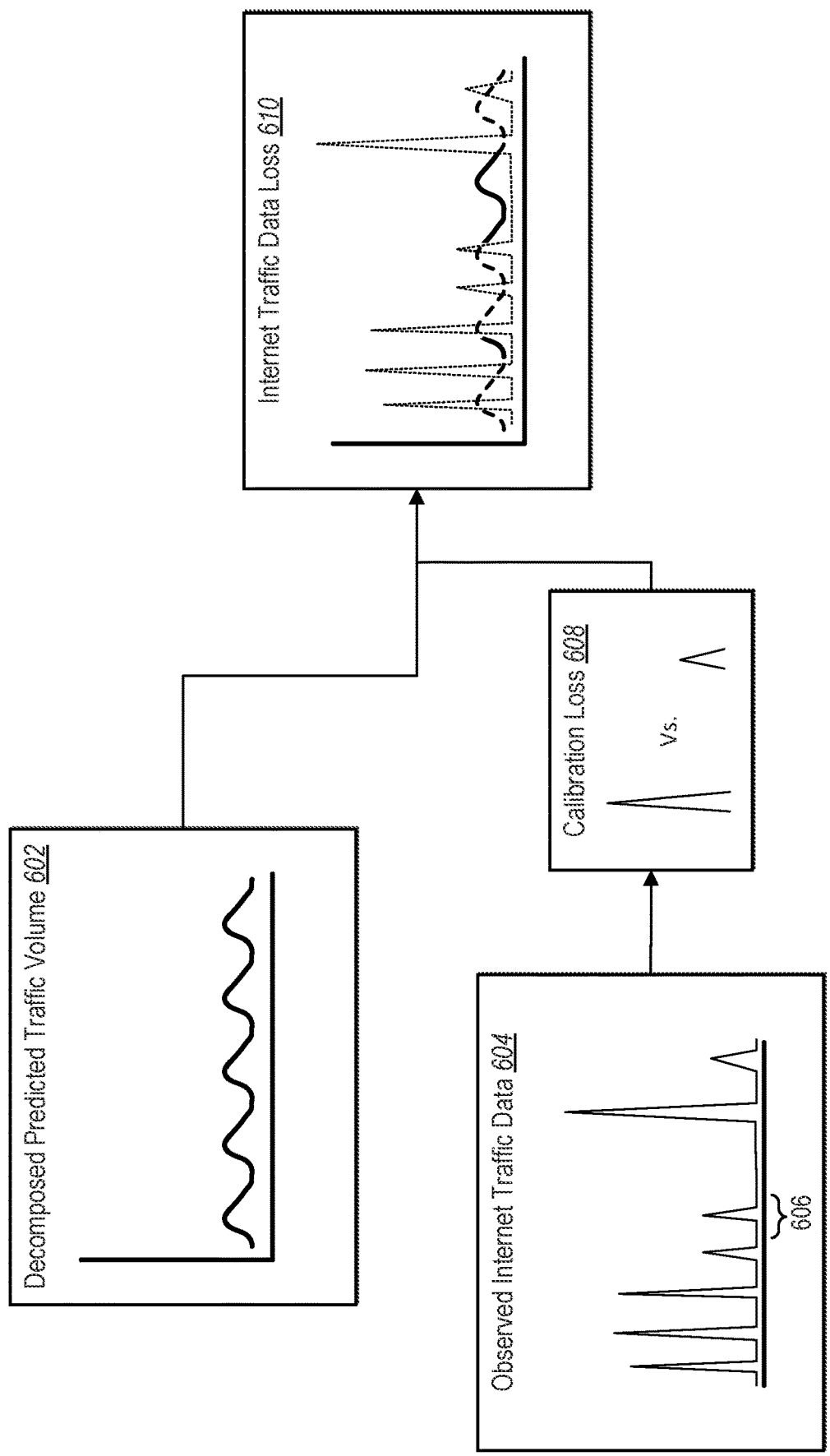
FIG. 6 illustrates an example diagram for determining an internet traffic data loss from decomposed predicted internet traffic volume and observed internet traffic data in accordance with one or more embodiments.

As mentioned above, in certain described embodiments, the data loss estimation system 102 determines or predicts an internet data loss for an outage period. In particular, the data loss estimation system 102 determines an internet traffic data loss based on a decomposed predicted traffic volume, while also accounting for recovery periods and non-outage related reductions in internet traffic. FIG. 6 illustrates an example diagram for determining an internet traffic data loss in accordance with one or more embodiments.

As illustrated in FIG. 6, the data loss estimation system 102 determines, predicts, or generates the internet traffic data loss 610 for an outage period. Specifically, the data loss estimation system 102 generates the internet traffic data loss 610 from decomposed predicted traffic volume 602 (e.g., the decomposed predicted traffic volume 512) indicating distributed internet traffic decomposed from bulk ingested internet traffic data. For example, the data loss estimation system 102 compares the decomposed predicted traffic volume 602 for an outage period and a corresponding recovery period with observed internet traffic volume for the same outage period and corresponding recovery period.

Indeed, the data loss estimation system 102 generates or determines the internet traffic data loss 610 from observed internet traffic data 604. In some cases, the data loss estimation system 102 determines a difference between the decomposed predicted traffic volume 602 over an outage period (and a recovery period) and the observed internet traffic data 604 for the outage period (and the recovery period). For instance, the data loss estimation system 102 subtracts the observed hits from the decomposed predicted hits to determine the lost hits due to the outage.

In addition, to further prevent overestimation of data loss (beyond accounting for a recovery period) the data loss estimation system 102 accounts for non-outage related reductions in internet traffic volume. To elaborate, in some circumstances, internet traffic reduces due to changes to a website, changes to an internet service, or changes to reporting parameters of a report suite (e.g., as set by an administrator device), and not due to an outage. To account for these circumstances, the data loss estimation system 102 determines a calibration loss 608 from the observed internet traffic data 604.

More specifically, the data loss estimation system 102 determines the calibration loss 608 by predicting internet traffic volume for one or more ingestion periods before the outage period. For instance, the data loss estimation system 102 determines a predicted internet traffic volume for the ingestion period 606 that occurs immediately prior to the outage period. Indeed, as shown by the observed internet traffic data 604, the two ingestion periods before the outage period reflect decreased traffic volume that are unrelated to an outage. Thus, the data loss estimation system 102 determines the calibration loss 608 to indicate a data loss that is due to this non-outage related traffic reduction.

To determine the calibration loss 608, the data loss estimation system 102 utilizes the methods and algorithms described herein for outage periods. In particular, the data loss estimation system 102 repeats the acts of FIG. 2 and the details provided in FIGS. 3-5 to determine a decomposed predicted traffic volume for the ingestion period 606. In some cases, the data loss estimation system 102 generates a predicted internet traffic distribution for the ingestion period 606. Based on the predicted internet traffic distribution, the data loss estimation system 102 decomposes the predicted traffic volume for the ingestion period 606. The data loss estimation system 102 further compares the decomposed predicted traffic volume for the ingestion period 606 with an observed traffic volume to determine an internet traffic data loss for the ingestion period 606. The data loss estimation system 102 utilizes the internet traffic data loss of the ingestion period 606 as the calibration loss 608.

Accordingly, the determine the internet traffic data loss 610 for an outage period, the data loss estimation system 102 incorporates the calibration loss 608 as part of the calculation. Specifically, the data loss estimation system 102 subtracts the calibration loss 608 from a loss that results from comparing the decomposed predicted traffic volume 602 with observed traffic volume for the outage period. As shown, the internet traffic data loss 610 reflects the data loss for the outage period (e.g., the lost hits) with the solid portion of the decomposed curve that coincides with the outage period.

As mentioned above, the data loss estimation system 102 improves accuracy over prior internet traffic monitoring systems. Indeed, experimenters have demonstrated the improvements of the data loss estimation system 102 over prior systems. For example, experimenters compared conventional models with the data loss estimation system 102 in generating predictions for internet traffic data loss from bulk ingested data. In the experiments, some conventional models were unable to generate accurate predictions because the bulk ingested data, with its lack of (or weak) periodicity and/or seasonality, led to constant zero predictions. The data loss estimation system 102, on the other hand, generated accurate predictions that closely tracked actual missing data for outage periods in the experiments, even for bulk ingested data.

Figure 7:
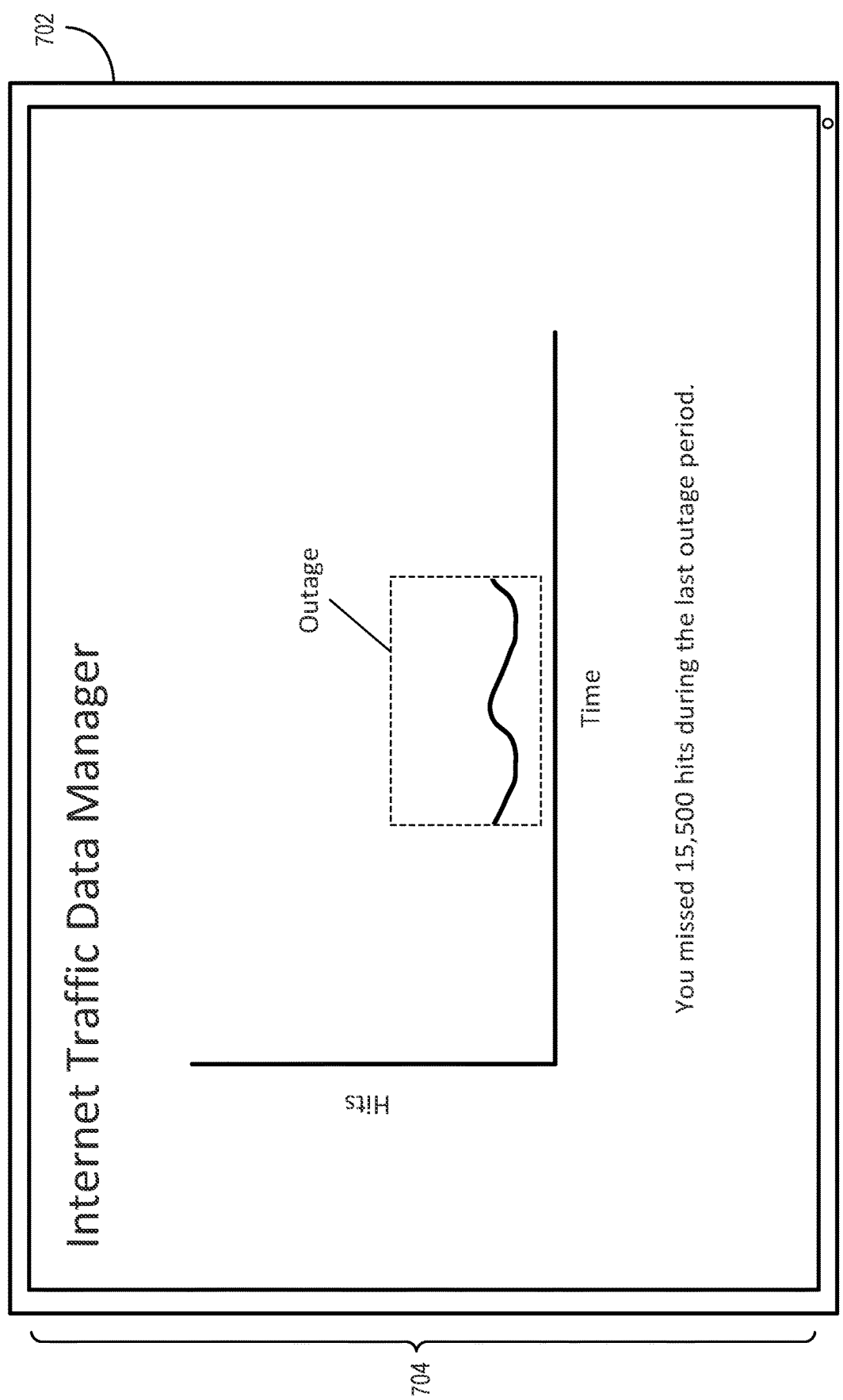
FIG. 7 illustrates an example graphical user interface depicting internet traffic data loss in accordance with one or more embodiments.

As mentioned above, in certain described embodiments, the data loss estimation system 102 generates and provides a representation of a predicted internet traffic data loss for display on a client device. In particular, the data loss estimation system 102 provides a visualization of a predict traffic data loss for display within a user interface of an administrator device associated with a report suite. FIG. 7 illustrates an example graphical user interface displaying predicted lost internet traffic data for a particular report suite or a particular internet service in accordance with one or more embodiments.

As illustrated in FIG. 7, the data loss estimation system 102 provides a data loss prediction interface 704 for display on an administrator device 702. Within the data loss prediction interface 704, the data loss estimation system 102 provides a visualization of lost internet traffic volume in the form of a graph of hits over time. As shown, the graph indicates a detected outage period along with a curve of decomposed traffic volume predicted for the outage period. In some embodiments, the data loss estimation system 102 provides a more complete visualization of hits over time with a highlight, such as a box or a different curve color, to indicate the portion of the graph representing lost traffic volume. Additionally, the data loss prediction interface 704 reflects a message of missed internet traffic volume due to the outage period ("You missed 15,500 hits during the last outage period.").

Figure 8:
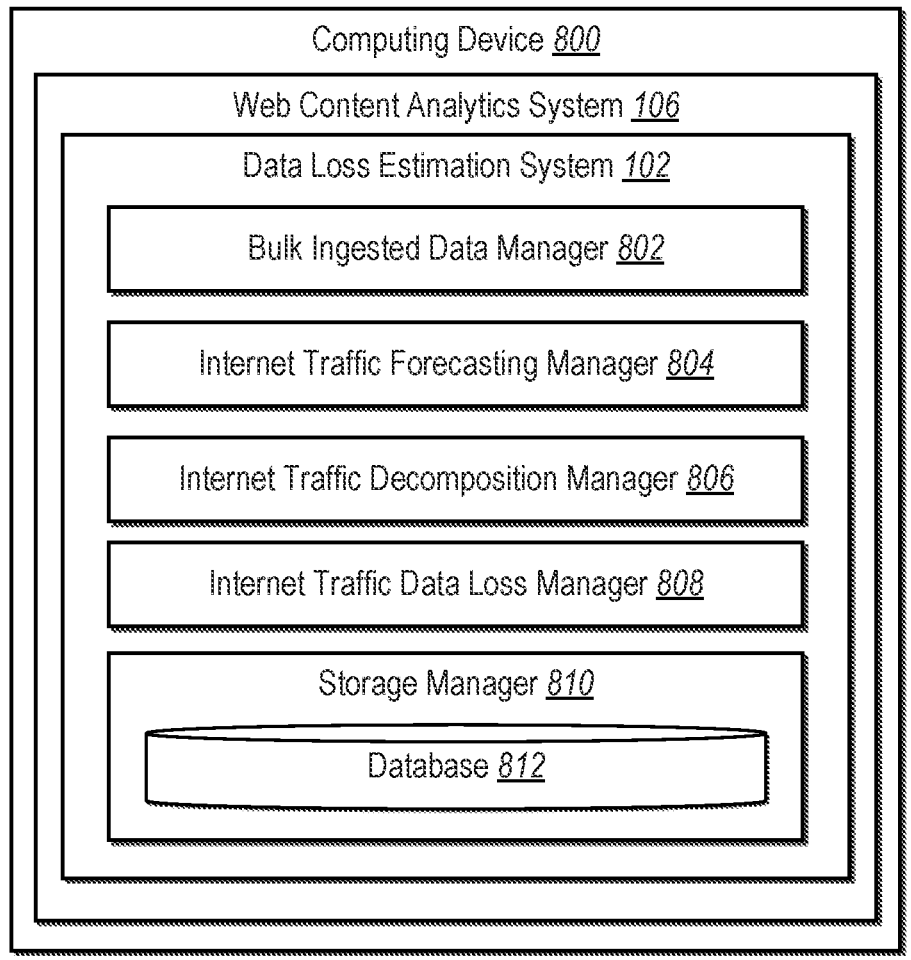
FIG. 8 illustrates an example schematic diagram of a data loss estimation system in accordance with one or more embodiments.

Looking now to FIG. 8, additional detail will be provided regarding components and capabilities of the data loss estimation system 102. Specifically, FIG. 8 illustrates an example schematic diagram of the data loss estimation system 102 on an example computing device 800 (e.g., one or more of the client devices 108a-108n, servers hosting the report suites 112a-112n, and/or the server(s) 104). As shown in FIG. 8, the data loss estimation system 102 includes a bulk ingested data manager 802, an internet traffic forecasting manager 804, an internet traffic decomposition manager, an internet traffic data loss manager 808, and a storage manager 810.

As just mentioned, the data loss estimation system 102 includes a bulk ingested data manager 802. In particular, the bulk ingested data manager 802 manages, maintains, observes, receives, detects, or ingests bulk ingested data. For example, the bulk ingested data manager 802 detects bulk ingested data as part of observed internet traffic data that includes bulk and non-bulk ingested data. In some cases, the bulk ingested data manager 802 also identifies or detects an outage period from bulk ingested data.

In addition, the data loss estimation system 102 includes an internet traffic forecasting manager 804. In particular, the internet traffic forecasting manager 804 manages, maintains, determines, predicts, forecasts, projects, or generates internet traffic for an outage period. For example, the internet traffic forecasting manager 804 determines predicted internet traffic volume lost during an outage period utilizing an internet traffic forecasting model. In some cases, the internet traffic forecasting manager 804 converts bulk ingested internet traffic data from a first periodicity (e.g., hours) to a second periodicity (e.g., days) by combining hits. From the converted bulk ingested data in the second periodicity, the internet traffic forecasting manager 804 further determines a number of hits that would have occurred during the outage period if no outage occurred.

Further, the data loss estimation system 102 includes an internet traffic decomposition manager 806. In particular, the internet traffic decomposition manager 806 manages, determines, or generates, decomposed internet traffic volume. For example, the internet traffic decomposition manager 806 decomposes predicted internet traffic volume lost during an outage period. In some cases, the internet traffic decomposition manager 806 decomposes traffic volume by estimating a traffic volume distribution and determining timestamps for hits that would have occurred during the outage period based on the distribution.

Additionally, the data loss estimation system 102 includes an internet traffic data loss manager 808. In particular, the internet traffic data loss manager 808 manages, determines, generates, predicts, or projects internet traffic data loss for an outage period. For example, the internet traffic data loss manager 808 compares observed internet traffic data for the outage period with predicted (and decomposed) internet traffic volume for the outage period to determine the lost data. The internet traffic data loss manager 808 further accounts for recovery periods and a calibration loss as described herein.

The data loss estimation system 102 further includes a storage manager 810. The storage manager 810 operates in conjunction with, or includes, one or more memory devices such as the database 812 that stores various data such as internet traffic data, predicted traffic volume, and/or an internet traffic forecasting model.

In one or more embodiments, each of the components of the data loss estimation system 102 are in communication with one another using any suitable communication technologies. Additionally, the components of the data loss estimation system 102 is in communication with one or more other devices including one or more client devices described above. It will be recognized that although the components of the data loss estimation system 102 are shown to be separate in FIG. 8, any of the subcomponents may be combined into fewer components, such as into a single component, or divided into more components as may serve a particular implementation. Furthermore, although the components of FIG. 8 are described in connection with the data loss estimation system 102, at least some of the components for performing operations in conjunction with the data loss estimation system 102 described herein may be implemented on other devices within the environment.

The components of the data loss estimation system 102 include software, hardware, or both. For example, the components of the data loss estimation system 102 include one or more instructions stored on a computer-readable storage medium and executable by processors of one or more computing devices (e.g., the computing device 800). When executed by the one or more processors, the computer-executable instructions of the data loss estimation system 102 cause the computing device 800 to perform the methods described herein. Alternatively, the components of the data loss estimation system 102 comprise hardware, such as a special purpose processing device to perform a certain function or group of functions. Additionally, or alternatively, the components of the data loss estimation system 102 include a combination of computer-executable instructions and hardware.

Furthermore, the components of the data loss estimation system 102 performing the functions described herein may, for example, be implemented as part of a stand-alone application, as a module of an application, as a plug-in for applications including content management applications, as a library function or functions that may be called by other applications, and/or as a cloud-computing model. Thus, the components of the data loss estimation system 102 may be implemented as part of a stand-alone application on a personal computing device or a mobile device. Alternatively, or additionally, the components of the data loss estimation system 102 may be implemented in any application that allows creation and delivery of content to users, including, but not limited to, applications in ADOBE® EXPERIENCE MANAGER and ADVERTISING CLOUD®, such as ADOBE ANALYTICS®, ADOBE AUDIENCE MANAGER®, and MARKETO®. "ADOBE," "ADOBE EXPERIENCE MANAGER," "ADVERTISING CLOUD," "ADOBE ANALYTICS," "ADOBE AUDIENCE MANAGER," and "MARKETO" are either registered trademarks or trademarks of Adobe Inc. in the United States and/or other countries.

FIGS. 1-8 the corresponding text, and the examples provide a number of different systems, methods, and non-transitory computer readable media for determining internet traffic data lost during an outage period from bulk ingested internet traffic data. In addition to the foregoing, embodiments can also be described in terms of flowcharts comprising acts for accomplishing a particular result. For example, FIG. 9 illustrates a flowchart of an example sequences or series of acts in accordance with one or more embodiments.

Figure 9:
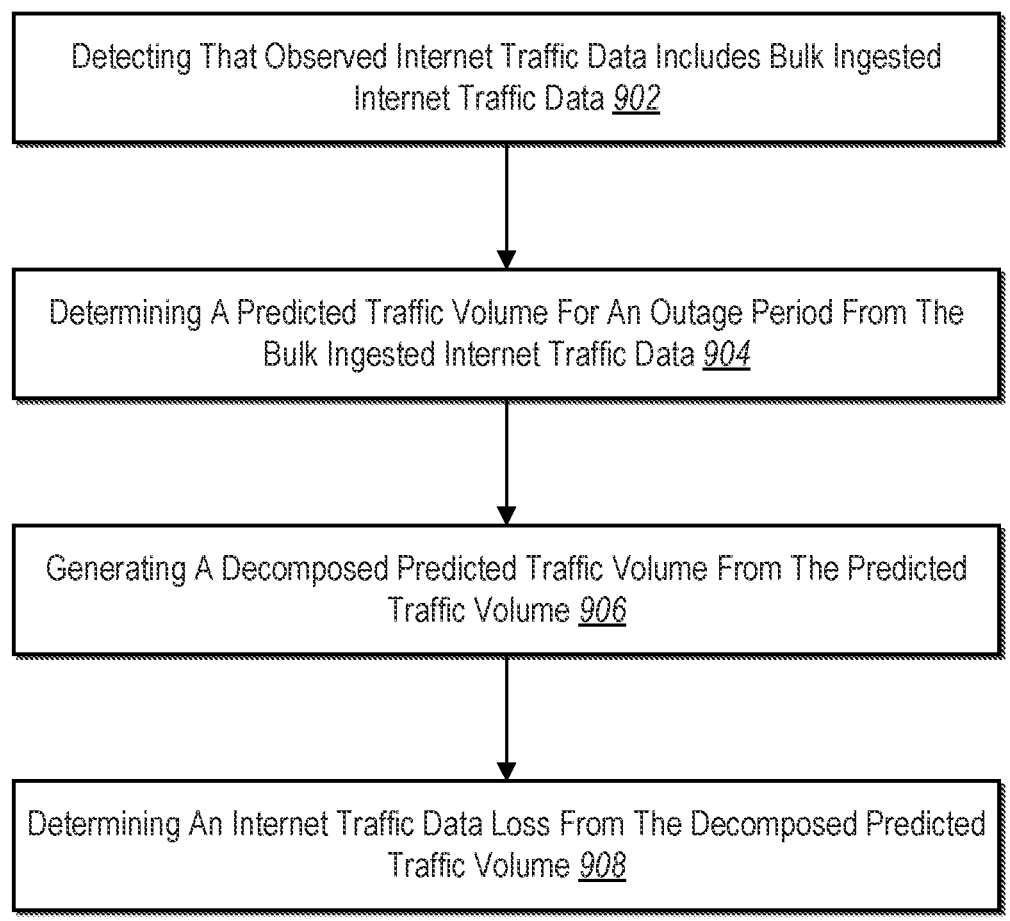
FIG. 9 illustrates a flowchart of a series of acts for determining an internet traffic data loss for an outage period from bulk ingested data in accordance with one or more embodiments.

While FIG. 9 illustrates acts according to particular embodiments, alternative embodiments may omit, add to, reorder, and/or modify any of the acts shown in FIG. 9. The acts of FIG. 9 can be performed as part of a method. Alternatively, a non-transitory computer readable medium can comprise instructions, that when executed by one or more processors, cause a computing device to perform the acts of FIG. 9. In still further embodiments, a system can perform the acts of FIG. 9. Additionally, the acts described herein may be repeated or performed in parallel with one another or in parallel with different instances of the same or other similar acts.

FIG. 9 illustrates an example series of acts 900 for determining internet traffic data lost during an outage period from bulk ingested internet traffic data. In particular, the series of acts 900 includes an act 902 of detecting that observed internet traffic data includes bulk ingested internet traffic data. For example, the act 902 involves detecting that observed internet traffic data received from one or more report suites associated with one or more server devices includes bulk ingested internet traffic data. In some cases, the act 902 involves determining, from the observed internet traffic data, that a number of missing ingestion entries for a data ingestion period satisfies a missing entry threshold. In one or more embodiments, the act 902 involves identifying the data ingestion period as a bulk ingestion period based on determining that the number of missing ingestion entries satisfies the missing entry threshold and determining that the observed internet traffic data includes a number of bulk ingestion periods that satisfies a threshold number of bulk ingestion periods. In certain cases, the act 902 involves detecting that the observed internet traffic data is received from the one or more report suites at intermittent intervals without receiving internet traffic data between the intermittent intervals.

As shown, the series of acts 900 includes an act 904 of determining a predicted traffic volume for an outage period from the bulk ingested internet traffic data. In particular, the act 904 involves determining, utilizing an internet traffic forecasting model based on determining that the observed internet traffic data includes bulk ingested internet traffic data, a predicted traffic volume that would have occurred during an outage period associated with the observed internet traffic data. In some cases, the act 904 involves based on determining that the observed internet traffic data includes bulk ingested internet traffic data, converting the bulk ingested internet traffic data to a periodicity corresponding to the outage period. In certain embodiments, the act 904 involves determining the predicted traffic volume for the outage period from the bulk ingested internet traffic data in the periodicity corresponding to the outage period. In one or more embodiments, the act 904 involves utilizing the internet traffic forecasting model based on multiplicative seasonality of the observed internet traffic data.

In addition, the series of acts 900 includes an act 906 of generating a decomposed predicted traffic volume from the predicted traffic volume. In particular, the act 906 involves generating a decomposed predicted traffic volume for the outage period by decomposing the predicted traffic volume from a first periodicity to a second periodicity smaller than the first periodicity. For example, the act 906 involves generating, for the outage period, a predicted internet traffic distribution from periods of the observed internet traffic data that are not bulk ingested and decomposing the predicted traffic volume for the outage period according to the predicted internet traffic distribution.

Further, the series of acts 900 includes an act 908 of determining an internet traffic data loss from the decomposed predicted traffic volume. In particular, the act 908 involves determining an internet traffic data loss from the decomposed predicted traffic volume. For example, the act 908 involves comparing the decomposed predicted traffic volume with a portion of the observed internet traffic data corresponding to the outage period. In some cases, the act 908 involves determining a difference between the predicted traffic volume for the outage period and a portion of the observed internet traffic data corresponding to the outage period.

In some embodiments, the series of acts 900 includes an act of determining, utilizing the internet traffic forecasting model, an additional predicted traffic volume that would have occurred during a recovery period after the outage period associated with the observed internet traffic data. In these or other embodiments, the series of acts 900 includes an act of determining the internet traffic data loss based on the predicted traffic volume for the outage period and the additional predicted traffic volume for the recovery period. In some cases, the series of acts 900 includes acts of determining, utilizing the internet traffic forecasting model, a received traffic volume during a recovery period within a threshold timeframe after the outage period and modifying the internet traffic data loss to account for the received traffic volume.

In some cases, the series of acts 900 also includes an act of determining a calibration data loss for a data ingestion period immediately prior to the outage period by comparing observed internet traffic data for the data ingestion period with predicted traffic volume for the data ingestion period and an act of determining the internet traffic data loss based on the calibration data loss. For example, the series of acts 900 includes an act of determining a calibration data loss to account for changes in the observed internet traffic data for a data ingestion period prior to the outage period and an act of modifying the internet traffic data loss according to the calibration data loss. Determining the predicted traffic volume for the data ingestion period involves generating a predicted internet traffic distribution for the data ingestion period, decomposing the predicted traffic volume for the data ingestion period according to the predicted internet traffic distribution, and comparing the predicted traffic volume with a portion of the observed internet traffic data corresponding to the data ingestion period.

In one or more embodiments, the series of acts 900 includes an act of providing a visual representation of the internet traffic data loss for display on a client device. In these or other embodiments, the series of acts 900 involves generating the internet traffic forecasting model to predict future internet traffic volume based on historical internet traffic data. The series of acts 900 sometimes includes an act of correcting an overestimated internet traffic data loss generated by a server device based on determining the internet traffic data loss from the decomposed predicted traffic volume.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 10:
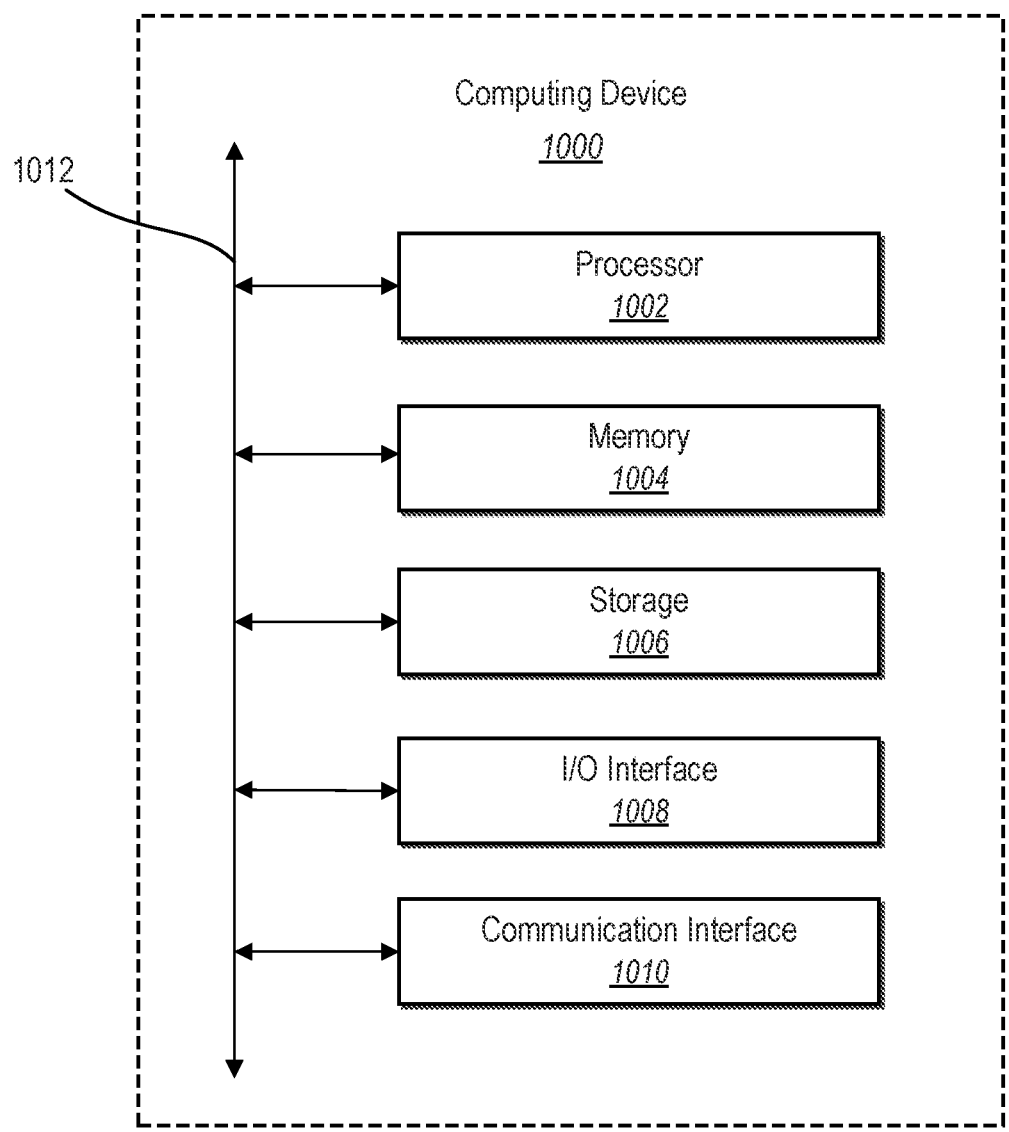
FIG. 10 illustrates a block diagram of an exemplary computing device in accordance with one or more embodiments.

FIG. 10 illustrates, in block diagram form, an example computing device 1000 (e.g., the computing device 800, the client devices 108a-108n, servers hosting the report suites 112a-112n, and/or the server(s) 104) that may be configured to perform one or more of the processes described above. One will appreciate that the data loss estimation system 102 can comprise implementations of the computing device 1000. As shown by FIG. 10, the computing device can comprise a processor 1002, memory 1004, a storage device 1006, an I/O interface 1008, and a communication interface 1010. Furthermore, the computing device 1000 can include an input device such as a touchscreen, mouse, keyboard, etc. In certain embodiments, the computing device 1000 can include fewer or more components than those shown in FIG. 10. Components of computing device 1000 shown in FIG. 10 will now be described in additional detail.

In particular embodiments, processor(s) 1002 includes hardware for executing instructions, such as those making up a computer program. As an example, and not by way of limitation, to execute instructions, processor(s) 1002 may retrieve (or fetch) the instructions from an internal register, an internal cache, memory 1004, or a storage device 1006 and decode and execute them.

The computing device 1000 includes memory 1004, which is coupled to the processor(s) 1002. The memory 1004 may be used for storing data, metadata, and programs for execution by the processor(s). The memory 1004 may include one or more of volatile and non-volatile memories, such as Random-Access Memory ("RAM"), Read Only Memory ("ROM"), a solid-state disk ("SSD"), Flash, Phase Change Memory ("PCM"), or other types of data storage. The memory 1004 may be internal or distributed memory.

The computing device 1000 includes a storage device 1006 includes storage for storing data or instructions. As an example, and not by way of limitation, storage device 1006 can comprise a non-transitory storage medium described above. The storage device 1006 may include a hard disk drive (HDD), flash memory, a Universal Serial Bus (USB) drive or a combination of these or other storage devices.

The computing device 1000 also includes one or more input or output ("I/O") devices/interfaces 1008, which are provided to allow a user to provide input to (such as user strokes), receive output from, and otherwise transfer data to and from the computing device 1000. These I/O devices/interfaces 1008 may include a mouse, keypad or a keyboard, a touch screen, camera, optical scanner, network interface, modem, other known I/O devices or a combination of such I/O devices/interfaces 1008. The touch screen may be activated with a writing device or a finger.

The I/O devices/interfaces 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1008 is configured to provide graphical data to a display for presentation to a user. The graphical data may be representative of one or more graphical user interfaces and/or any other graphical content as may serve a particular implementation.

The computing device 1000 can further include a communication interface 1010. The communication interface 1010 can include hardware, software, or both. The communication interface 1010 can provide one or more interfaces for communication (such as, for example, packet-based communication) between the computing device and one or more other computing devices 1000 or one or more networks. As an example, and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI. The computing device 1000 can further include a bus 1012. The bus 1012 can comprise hardware, software, or both that couples components of computing device 1000 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A method comprising:
   detecting that observed internet traffic data associated with one or more server devices includes bulk internet traffic data;
   determining, utilizing an internet traffic forecasting model based on determining that the observed internet traffic data includes bulk internet traffic data, a predicted traffic volume that would have occurred during an outage period associated with the observed internet traffic data;
   generating a decomposed predicted traffic volume for the outage period by decomposing the predicted traffic volume from a first periodicity to a second periodicity smaller than the first periodicity; and
   determining an internet traffic data loss from the decomposed predicted traffic volume.

2. The method of claim 1, wherein detecting that the observed internet traffic data includes the bulk internet traffic data comprises detecting that the observed internet traffic data is received from one or more report suites at intermittent intervals while receiving internet traffic data below a threshold volume between the intermittent intervals.

3. The method of claim 1, wherein generating the decomposed predicted traffic volume comprises:
   determining, from the observed internet traffic data, an internet traffic distribution for one or more periods that are not bulk ingested;
   generating a predicted internet traffic distribution for the outage period based on the internet traffic distribution for the one or more periods that are not bulk ingested; and
   determining the decomposed predicted traffic volume according to the predicted internet traffic distribution.

4. The method of claim 1, wherein determining the predicted traffic volume for the outage period comprises:
   determining a periodicity associated with the bulk internet traffic data of the observed internet traffic data;
   based on determining that the outage period has a different periodicity than the periodicity associated with the bulk internet traffic data, converting the bulk internet traffic data from the periodicity to the different periodicity; and
   generating, utilizing the internet traffic forecasting model trained to generate traffic volume predictions, the predicted traffic volume for the outage period for the different periodicity.

5. The method of claim 1, further comprising correcting a traffic data loss generated by a server device based on determining the internet traffic data loss from the decomposed predicted traffic volume.

6. The method of claim 1, wherein determining the internet traffic data loss comprises determining a difference between the predicted traffic volume for the outage period and a portion of the observed internet traffic data corresponding to the outage period.

7. A non-transitory computer readable medium storing executable instructions which, when executed by a processing device, cause the processing device to perform operations comprising:
   detecting that observed internet traffic data associated with one or more server devices includes bulk internet traffic data;
   determining, utilizing an internet traffic forecasting model based on determining that the observed internet traffic data includes bulk internet traffic data, a predicted traffic volume that would have occurred during an outage period associated with the observed internet traffic data;
   generating a decomposed predicted traffic volume for the outage period by decomposing the predicted traffic volume from a first periodicity to a second periodicity smaller than the first periodicity; and
   determining an internet traffic data loss from the decomposed predicted traffic volume.

8. The non-transitory computer readable medium of claim 7, wherein detecting that the observed internet traffic data includes bulk internet traffic data comprises determining, from the observed internet traffic data, that a number of missing ingestion entries for a data ingestion period satisfies a missing entry threshold.

9. The non-transitory computer readable medium of claim 7, wherein determining the predicted traffic volume for the outage period comprises:
   based on determining that the observed internet traffic data includes bulk internet traffic data, converting the bulk internet traffic data to a periodicity corresponding to the outage period; and
   determining the predicted traffic volume for the outage period from the bulk internet traffic data in the periodicity corresponding to the outage period.

10. The non-transitory computer readable medium of claim 7, wherein generating the decomposed predicted traffic volume comprises:
    generating, for the outage period, a predicted internet traffic distribution from periods of the observed internet traffic data that are not bulk ingested; and
    decomposing the predicted traffic volume for the outage period according to the predicted internet traffic distribution.

11. The non-transitory computer readable medium of claim 7, further storing executable instructions which, when executed by the processing device, cause the processing device to perform operations comprising:
    determining, utilizing the internet traffic forecasting model, an additional predicted traffic volume that would have occurred during a recovery period after the outage period associated with the observed internet traffic data; and determining the internet traffic data loss based on the predicted traffic volume for the outage period and the additional predicted traffic volume for the recovery period.

12. The non-transitory computer readable medium of claim 7, further storing executable instructions which, when executed by the processing device, cause the processing device to perform operations comprising:

determining a calibration data loss for a data ingestion period immediately prior to the outage period by comparing observed internet traffic data for the data ingestion period with predicted traffic volume for the data ingestion period; and determining the internet traffic data loss based on the calibration data loss.

13. The non-transitory computer readable medium of claim 12, further storing executable instructions which, when executed by the processing device, cause the processing device to perform operations comprising determining the predicted traffic volume for the data ingestion period by:

generating a predicted internet traffic distribution for the data ingestion period;

decomposing the predicted traffic volume for the data ingestion period according to the predicted internet traffic distribution; and comparing the predicted traffic volume with a portion of the observed internet traffic data corresponding to the data ingestion period.

14. A system comprising:

a memory component; and one or more processing devices coupled to the memory component, the one or more processing devices to perform operations comprising:

detecting that observed internet traffic data associated with one or more server devices includes bulk internet traffic data;

determining, utilizing an internet traffic forecasting model based on determining that the observed internet traffic data includes bulk internet traffic data, a predicted traffic volume that would have occurred during an outage period associated with the observed internet traffic data;

generating, for the outage period, a predicted internet traffic distribution from one or more periods of the internet traffic data that are not bulk ingested;

generating a decomposed predicted traffic volume for the outage period by decomposing the predicted traffic volume from a first periodicity to a second periodicity smaller than the first periodicity according to the predicted internet traffic distribution; and determining an internet traffic data loss by comparing the decomposed predicted traffic volume with a portion of the observed internet traffic data corresponding to the outage period.

15. The system of claim 14, wherein detecting that the observed internet traffic data includes bulk internet traffic data comprises:

determining, from the observed internet traffic data, that a number of missing ingestion entries for a data ingestion period satisfies a missing entry threshold;

identifying the data ingestion period as a bulk ingestion period based on determining that the number of missing ingestion entries satisfies the missing entry threshold; and determining that the observed internet traffic data includes a number of bulk ingestion periods that satisfies a threshold number of bulk ingestion periods.

16. The system of claim 14, wherein the one or more devices are to perform further operations comprising:

determining, utilizing the internet traffic forecasting model, a received traffic volume during a recovery period within a threshold timeframe after the outage period; and modifying the internet traffic data loss to account for the received traffic volume.

17. The system of claim 14, wherein the one or more devices are to perform further operations comprising:

determining a calibration data loss to account for changes in the observed internet traffic data for a data ingestion period prior to the outage period; and modifying the internet traffic data loss according to the calibration data loss.

18. The system of claim 14, wherein determining the predicted traffic volume for the outage period comprises utilizing the internet traffic forecasting model based on multiplicative seasonality of the observed internet traffic data.

19. The system of claim 14, wherein the one or more devices are to perform further operations comprising generating the internet traffic forecasting model to provide a visual representation of the internet traffic data loss for display on a client device.

20. The system of claim 14, wherein the one or more devices are to perform further operations comprising training the internet traffic forecasting model to predict future internet traffic volume based on historical internet traffic data.

* * * * *